(12) United States Patent
Smith

(10) Patent No.: US 8,919,861 B1
(45) Date of Patent: Dec. 30, 2014

(54) PORTABLE TEMPORARY EXTENSION ENCLOSURE FOR FOLDING TRAILERS

(71) Applicant: Robert Smith, Annapolis, MD (US)

(72) Inventor: Robert Smith, Annapolis, MD (US)

( * ) Notice: Subject to any disclaimer, the term of this patent is extended or adjusted under 35 U.S.C. 154(b) by 0 days.

(21) Appl. No.: 14/107,571

(22) Filed: Dec. 16, 2013

(51) Int. Cl.
*B60P 3/00* (2006.01)
*B60P 3/36* (2006.01)

(52) U.S. Cl.
CPC .......................................... *B60P 3/36* (2013.01)
USPC .......................................... 296/159; 296/161

(58) Field of Classification Search
USPC ......... 296/159, 161, 169, 170, 171, 173, 174, 296/175, 176, 26.08, 26.09, 26.1, 26.11, 296/26.12, 26.13, 26.14, 26.15; 135/88.15
See application file for complete search history.

(56) References Cited

U.S. PATENT DOCUMENTS

| 2,188,545 | A  | * | 1/1940  | Smelker .................... 296/26.11 |
| 4,457,553 | A  | * | 7/1984  | Larkin ......................... 296/160 |
| 7,464,983 | B1 | * | 12/2008 | Acosta et al. ................. 296/152 |
| 7,681,941 | B2 | * | 3/2010  | Freeman et al. .............. 296/168 |
| 2006/0162755 | A1 | * | 7/2006 | Platek et al. ................ 135/88.15 |

* cited by examiner

*Primary Examiner* — Joseph D Pape
(74) *Attorney, Agent, or Firm* — Harpman & Harpman

(57) ABSTRACT

A flexible extension storage enclosure for folding travel trailers that is selectively secured to the underside of a folding trailer extension after it has been deployed from the main body of the travel trailer. The storage extension enclosure provides additional usable weather tight storage area beneath the extension by using a combination of track insertable support rails and a plurality of wall surface mounted snaps to define selectively accessible integrated storage compartment there beneath with a selective access closure.

7 Claims, 4 Drawing Sheets

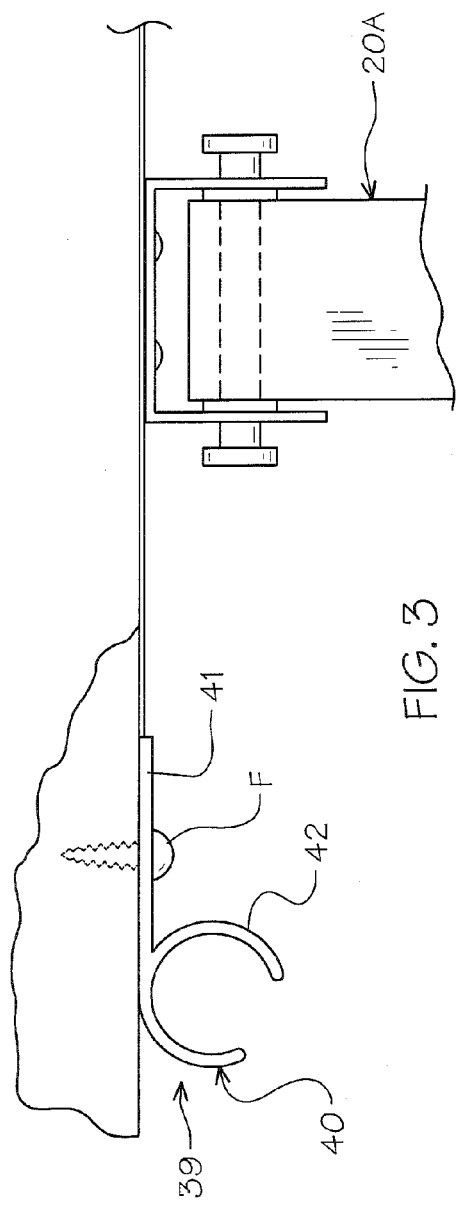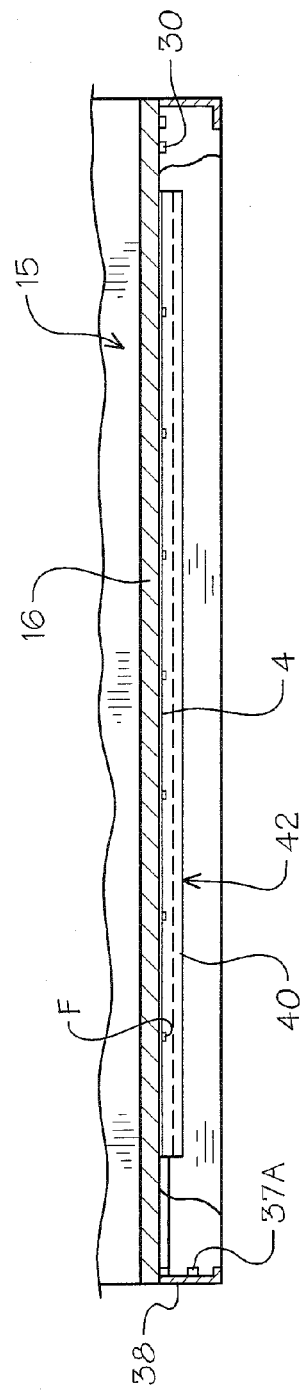

PORTABLE TEMPORARY EXTENSION ENCLOSURE FOR FOLDING TRAILERS

BACKGROUND OF THE INVENTION

1. Technical Field

This invention relates to travel trailers that extend and unfold to provide a usable interior space for camping and the like. More specifically, to trailers and vehicle expansion enclosure systems that are connected to and primarily supported by the trailer or the vehicle to which it is attached.

2. Description of Prior Art

Prior art trailer enclosure attachments have been directed to collapsible enclosures for shelters and storage that have been secured to and extend beyond the supportive surface of the trailers or vehicles. See for example U.S. Pat. Nos. 3,923,336, 4,065,166, 4,457,553, 6,871,896 and U.S. Publication 2009/0159108.

In U.S. Pat. No. 3,923,336 a tent accessory for a truck is disclosed having a tent configuration with a sealing, sidewalls and floor for use as a room addition for the camper.

U.S. Pat. No. 4,457,553 is directed to a portable shower for a van having a slidably disposed upper tubular frame from which are selectively secured depending side and end walls to form and open top shower enclosure against the back end of the van.

U.S. Pat. No. 4,065,166 is directed to a demountable extension enclosure for motor vehicles having a tent-like structure that extends up from a floor board that extends from the doorway of the loading door of the vehicle.

U.S. Pat. No. 6,871,896 claims a temporary vehicle enclosure expansion system that uses the vehicle's door to support an enclosure extending therebetween.

Finally, in U.S. Patent Publication 2009/0159108 a storage facility is illustrated that extends from the rear of a vehicle having bag bins and boxes therewithin.

SUMMARY OF THE INVENTION

A slide and snap easy installation storage enclosure formed of flexible collapsible integrated fabric walls, door and floor that suspends from the extension platform and frame of a fold-up travel trailer. The storage enclosure has wall support rods which are slidably engaged into permanently affixed tracks on the bottom of the fold-up trailer extension and a series of interconnecting snaps on the storage enclosure's front and back wall to support same when secured therewith.

DESCRIPTION OF THE DRAWINGS

FIG. 3 is an enlarged partial exploded end elevational view of the side wall mounting tracks.

FIG. 4 is a partial side elevational view of the slide mounting track.

DETAILED DESCRIPTION OF THE INVENTION

Figure 1:
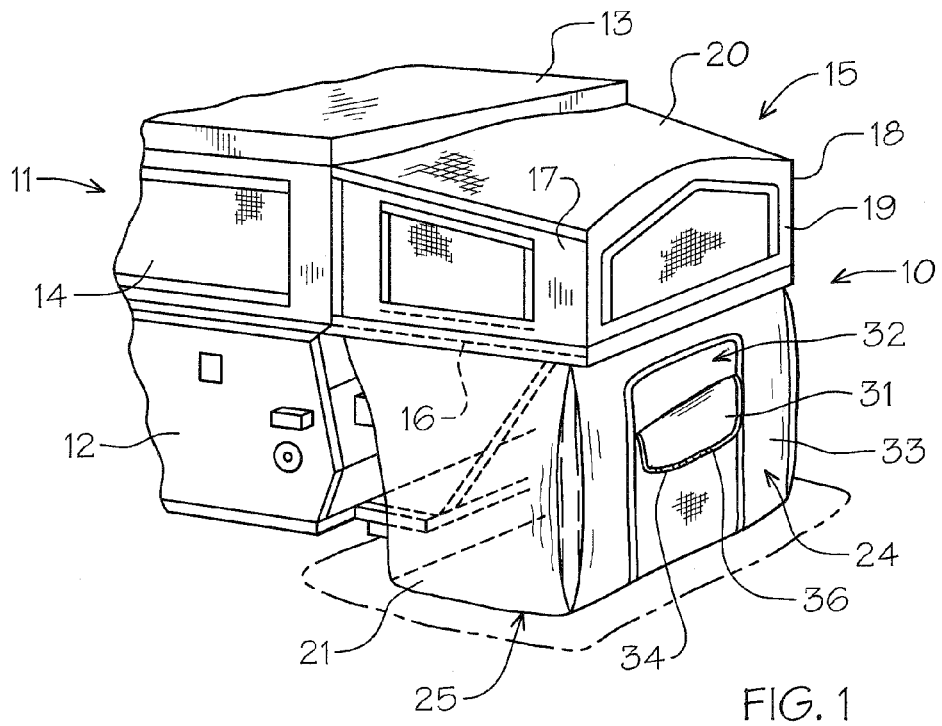
FIG. 1 is a perspective view of the portable storage extension for a travel trailer in installed format.
Figure 2:
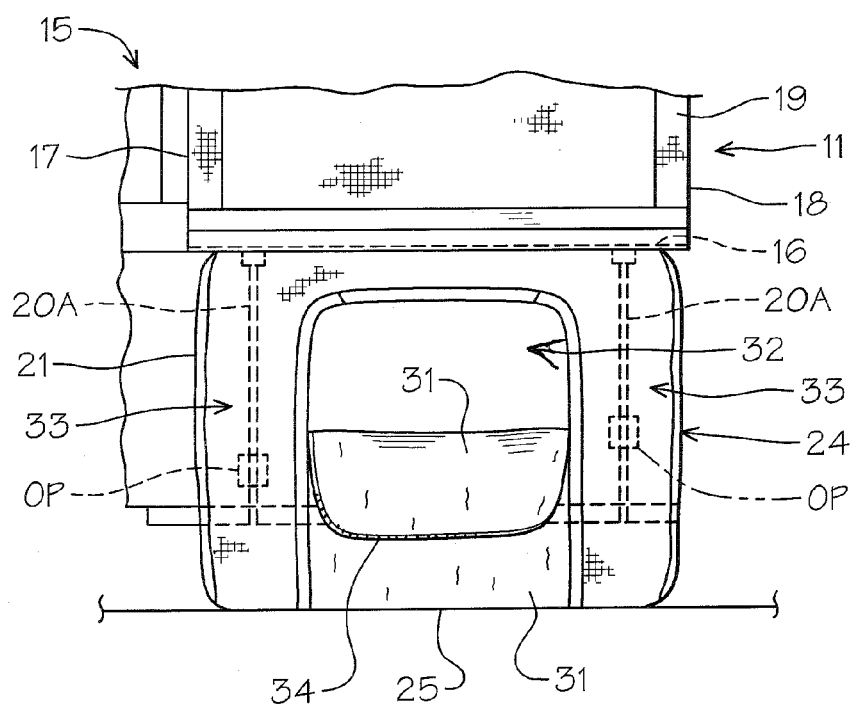
FIG. 2 is a partial front elevational view thereof.

Referring to FIGS. 1 and 2 of the drawings, a storage enclosure 10 of the invention can be seen attached to a travel trailer 11. The storage enclosure 10 is designated in this application to add auxiliary storage compartment to a folding travel trailer that has a main wheel trailer section 12 with a top cap 13 that is raised into a locked use position as seen in FIG. 1 of the drawings. A combination of structural support elements and flexible fabric panels are arranged to define sidewalls 14 that define the main trailer enclosure. As such, an end trailer extension 15 is slidably disposed from the main trailer section 12 with a base support platform 16 and extending flexible sides 17 and 18 and end wall 19 with an integrated top 20 as is typical in the art. Such slide out extensions 15 are typically supported by a pair of angular extending rod braces 20A secured to the main trailer section 12 and to the underside of the support platform 16 again as is well known and understood within the art.

The storage enclosure 10 of the invention is of an overall fabric construction with oppositely disposed spaced parallel fabric sidewalls 21 and 22 with interconnecting end wall 23 and a front access wall 24 as will be described in greater detail hereinafter.

Figure 5:
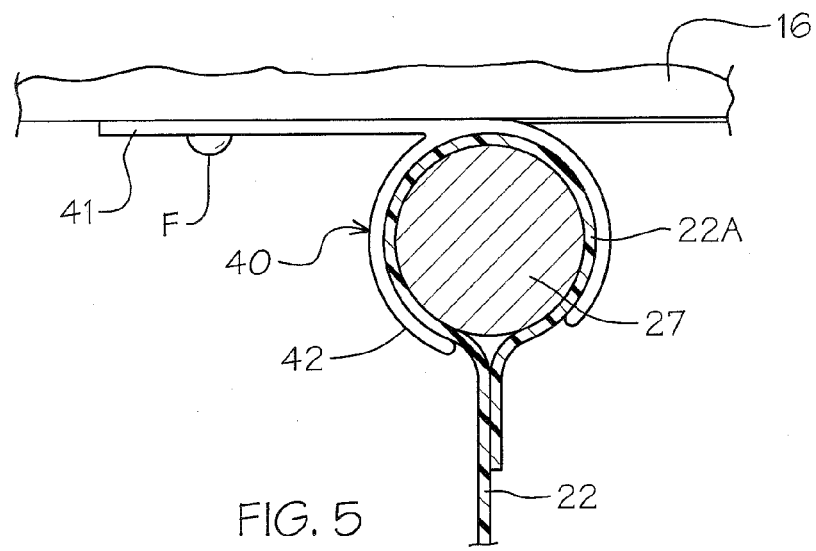
FIG. 5 is an enlarged partial cross-sectional view of the slide mounting channel with an enclosure wall support rod positioned therewithin.
Figure 6:
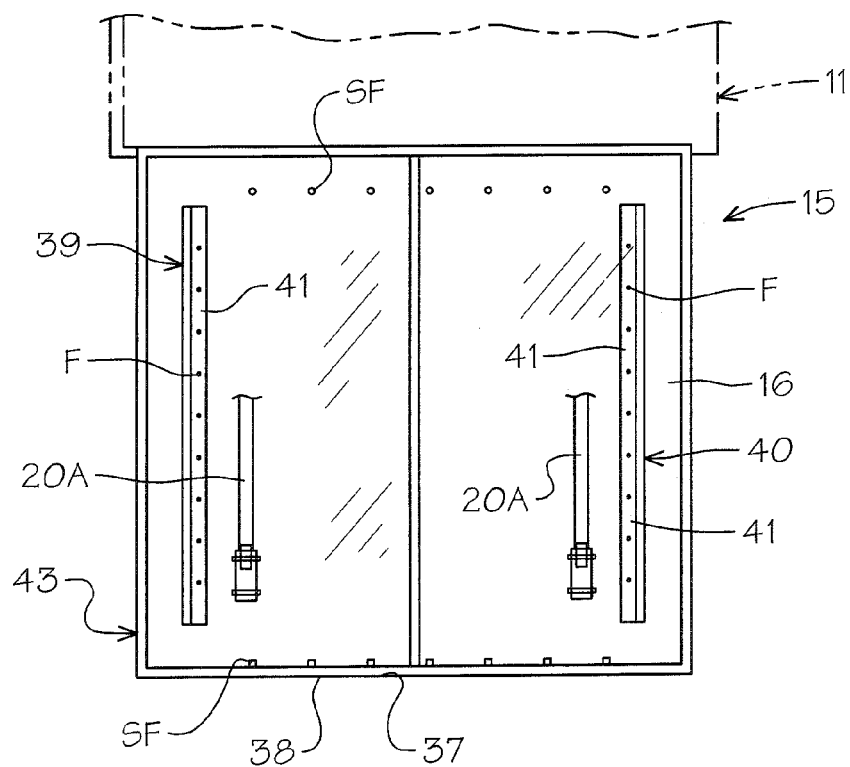
FIG. 6 is a bottom plan view of the installed sidewall mounting tracks on the trailer extension.
Figure 7:
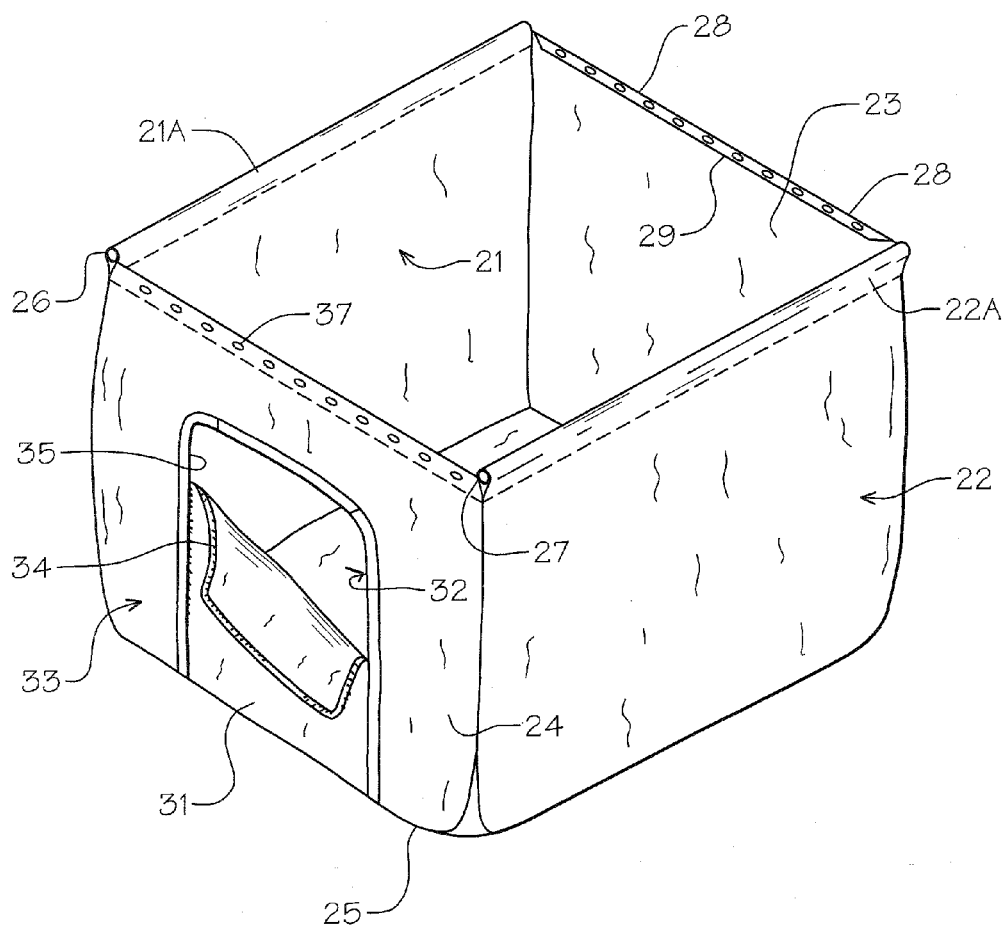
FIG. 7 is a perspective view of the portable storage extension independent of the trailer.

A fabric floor panel 25 interconnect the respective side, ends and access walls 21-24 respectively as best seen in FIGS. 3, 4 and 6 of the drawings. The respective sidewalls of the enclosure 21 and 22 each have elongated tubular sewn upper edges 21A and 22A extending their respective lengths. The tubular upper edges 21A and 22A define receivable passageways for corresponding pairs of rigid wall support rods 26 and 27 which are inserted and secured respectively therewithin as best seen in FIG. 5 of the drawings.

The end wall 23 has a plurality of longitudinally aligned and spaced snap fastener assemblies 28 secured along its upper free edge 29 which will correspond to registerable snap fastener fittings 30 secured to the underside of the trailer end extension 15 on its base support platform 16 as shown in FIG. 6 of the drawings for installation as hereinbefore described.

The front access wall 24 of the storage enclosure 10 has an access door panel 31 which is selectively secured within a correspondingly shaped opening 32 of the front access wall surface 33. A progressively engagement closure zipper 34 is secured around the perimeter edge 35 of the opening 32 and the edge 36 of the door access panel 31 so as to provide a continuous engagement and retainment therebetween as will be well understood in the art.

The door panel 31 can be "unzipped" allowing access to the storage enclosure 10 when in use and attached to the travel trailer 11. A number of "snap" fasteners 37 are attached to the upper free edge perimeter of the front wall 24 for aligned registration with fastener base 37A secured, in this example, to a front end frame rail 38 of the trailer extension 15.

It will be seen that the primary compartment engagement securement and support to the underside of the support platform 16 of the extension 15 is enabled by a pair of elongated slotted guide wall support channel fittings 39 and 40, best seen in FIGS. 3-6 of the drawings. The support channel fittings 39 and 40 can be seen as having a mounting flange 41 with a plurality of longitudinally spaced and aligned fastener apertures A therewithin. A slotted cylindrical receiving channel 42 extend integrally therealong. The guide wall support channel fittings 39 and 40 are secured to the underside of the base support platform 16 in spaced parallel relation to one another inwardly of the respective sides and ends of the platform and frame 43 as best seen in FIGS. 4 and 6 of the drawings via multiple fasteners F through the respective hereinbefore defined apertures A therewithin.

To attach and deploy the storage enclosure 10 of the invention, the respective sidewall upper edges with rod inserts 21A and 22A are slidably disposed within the respective wall support channel fittings 39 and 40 with the respective end wall and front wall snap fittings engaged onto the corresponding aligned registration snaps as hereinbefore described.

It will be seen that in order to achieve installation, a pair of openings OP are formed in the end wall 23 as seen in broken lines in FIG. 2 to allow for the passage therethrough of the support platform 16's angular rods 20A in such a deployment representation as illustrated in this example.

It will be evident from the above description that as so deployed the storage enclosure 10 of the invention is now ready for use by selective access thereto via the zipper access door panel 31 as hereinbefore described.

It will thus be seen that a new and novel storage enclosure for a travel trailer has been illustrated and described and it will be apparent to those skilled in the art that various changes and modifications may be made without departing from the spirit of the invention.

Therefore I claim:

1. A demountable storage extension enclosure for a travel trailer provided with a slide-out end extension compartment, the storage extension enclosure comprises,
    a flexible fabric multiple walled enclosure removably secured to and from a base support of said end extension,
    said walled enclosures comprising, a pair of spaced parallel sidewalls, an interconnecting end wall and an interconnecting front wall with an access closure therewithin, a flexible interconnecting floor panel and means for structurally suspending said sidewalls to said base support and selectively securing said remaining walls to said end extension when in an extended deployed position.

2. The demountable storage extension enclosure for a travel trailer set forth in claim 1 wherein said access closure in said front wall comprises,
    a flexible door panel removably secured about its perimeter within a registering opening in said front wall.

3. The demountable storage extension enclosure for a travel trailer as seen in claim 1 wherein said means for structurally securing said sidewalls to said base support comprises,
    a pair of slotted guide wall support channel fittings secured to the underside of said base support of the end extension, and support rods within upper edges of said sidewalls slidably disposed within said respective slotted guide wall support channels.

4. The demountable storage extension enclosure for a travel trailer as seen in claim 1 wherein said means for selectively securing said remaining walls to said end extension when in extended deployed position comprises,
    a plurality of interengageable snap fittings on said front enclosure wall and correspondingly and respectively on said base support of said slide out end extension compartment.

5. The demountable storage extension enclosure for a travel trailer as seen in claim 1 wherein said flexible fabric multiple wall enclosure is constructed of water-proof synthetic resin tenting material.

6. The demountable storage extension enclosure for a travel trailer set forth in claim 2 wherein said access closure and said registering opening within said front wall and said flexible door panel have a mating zipper configuration therebetween.

7. The demountable storage extension enclosure for a travel trailer set forth in claim 4 wherein said means for selectively securing said remaining walls to said end extension further comprise, a plurality of interengagement snap fittings on said end wall of said enclosure and corresponding respectively so aligned base snaps on said slide out extension base support of said slide out end extension compartment.

\* \* \* \* \*